United States Patent [19]

Koden et al.

[11] Patent Number: 5,215,678
[45] Date of Patent: Jun. 1, 1993

[54] FERROELECTRIC LIQUID CRYSTAL COMPOSITION AND LIQUID CRYSTAL DEVICE INCORPORATING SAME

[75] Inventors: Mitsuhiro Koden; Tomoaki Kuratate, both of Nara; Fumiaki Funada, Yamatokoriyama; Kazuhiko Sakaguchi, Toyonaka; Naoya Kasai, Amagasaki; Yoshikazu Takehira, Itami; Tohru Kitamura, Kyoto; Yutaka Shiomi, Amagasaki, all of Japan

[73] Assignees: Sharp Kabushiki Kaisha; Daiso Co., both of Osaka, Japan

[21] Appl. No.: 808,070

[22] Filed: Dec. 10, 1991

Related U.S. Application Data

[63] Continuation of Ser. No. 502,570, Mar. 30, 1990, abandoned.

[30] Foreign Application Priority Data

Mar. 31, 1989 [JP] Japan .................. 1-82355

[51] Int. Cl.$^5$ ............... C09K 19/34; C09K 19/52; C09K 19/32
[52] U.S. Cl. ............... 252/299.61; 252/299.01; 252/299.63
[58] Field of Search ............... 252/299.01, 299.61, 252/299.63, 299.66

[56] References Cited

U.S. PATENT DOCUMENTS

| | | | |
|---|---|---|---|
| 4,909,957 | 3/1990 | Sakaguchi et al. | 252/299.61 |
| 4,973,425 | 11/1990 | Kazuhiko et al. | 252/299.61 |
| 5,026,506 | 6/1991 | Koden et al. | 252/299.61 |

FOREIGN PATENT DOCUMENTS

| | | |
|---|---|---|
| 0306919 | 3/1989 | European Pat. Off. . |
| 88114609.6 | 3/1989 | European Pat. Off. . |
| 0355830 | 2/1990 | European Pat. Off. . |
| 63-304088 | 12/1988 | Japan . |
| 64-9286 | 1/1989 | Japan . |
| 2216540 | 10/1989 | United Kingdom . |

*Primary Examiner*—Richard D. Lovering
*Assistant Examiner*—Philip Tucker
*Attorney, Agent, or Firm*—David G. Conlin; Peter F. Corless

[57] ABSTRACT

A ferroelectric liquid crystal composition comprising at least one compound represented by the formula (I):

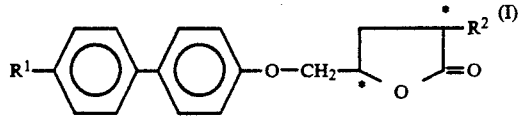

wherein $R^1$ and $R^2$ are, the same or different, a straight-chain or branched-chain alkyl group having 1 to 15 carbon atoms, and each asterisk represents an asymmetric carbon atom, and at least one compound represented by the formula (II):

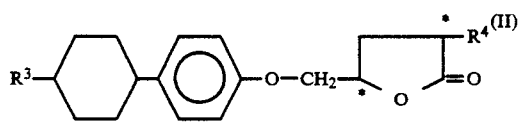

wherein $R^3$ and $R^4$ are, the same or different, a straight-chain or branched-chain alkyl group having 1 to 15 carbon atoms, and each asterisk represents an asymmetric carbon atom, and liquid crystal device incorporating same.

6 Claims, 1 Drawing Sheet

FERROELECTRIC LIQUID CRYSTAL COMPOSITION AND LIQUID CRYSTAL DEVICE INCORPORATING SAME

This is a continuation of copending application(s) Ser. No. 07/502,570 filed on Mar. 30, 1990, now abandoned.

BACKGROUND OF THE INVENTION

1. Field of the Invention

The present invention relates to ferroelectric liquid crystal compositions and liquid crystal devices incorporating the composition.

2. Description of the Prior Art

Presently liquid crystal display devices predominantly utilize the nematic phase of liquid crystals, while active research has also been conducted in recent years on various display modes utilizing a smectic phase. Especially promising is ferroelectric liquid crystal display utilizing a chiral smectic C phase because this mode is adapted to large-capacity display with a wide viewing angle.

The liquid crystal material for use in the ferroelectric liquid crystal display device wherein the smectic C phase is utilized must of course exhibit the smectic C phase over a wide temperature range around room temperature and needs to fulfill various other requirements. First, the device for large-capacity display must have high-speed responsiveness, and from this viewpoint, the liquid crystal material needs to be highly amenable to spontaneous polarization and low in viscosity. Further to obtain satisfactory orientation and bistability when used for the liquid crystal cell, the liquid crystal material needs to exhibit the phase series of IAC (Isotropic-Smectic-A-Smectic C) or INAC (Isotropic-Nematic-Smectic A-Smectic C), and the helical pitch of nematic phase and smectic C phase needs to be sufficiently larger than the cell thickness. It is also desired that the material be great in tilt angle which is relevant to the contrast and brightness of liquid crystal display. The material must also be optimized in dielectric anisotropy, refractive index anisotropy, specific resistance, etc.

At present, however, it is impossible for a single compound to fulfill all the desired requirements, so that a plurality of compounds are usually mixed together for use as a liquid crystal composition. To prepare a liquid crystal composition fulfilling the requirements for actual use, it is necessary to use numerous single liquid crystal compounds having a wide variety of properties. It is even likely that compounds which per se exhibit no liquid crystal properties will be useful as components of the liquid crystal composition.

SUMMARY OF THE INVENTION

An object of the invention is to provide a ferroelectric liquid crystal composition having a wide range of operating temperatures, satisfactory in orientation and exhibiting high-speed responsiveness at room temperature, and a liquid crystal device comprising the composition.

The present invention provides:

a) a ferroelectric liquid crystal composition comprising at least one compound represented by the formula (I)

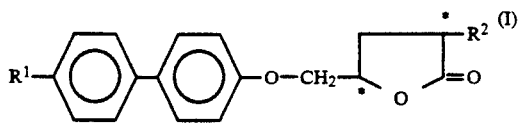

wherein $R^1$ and $R^2$ are, the same or different, a straight-chain or branched-chain alkyl group having 1 to 15 carbon atoms, and each asterisk represents an asymmetric carbon atom, and at least one compound represented by the formula (II):

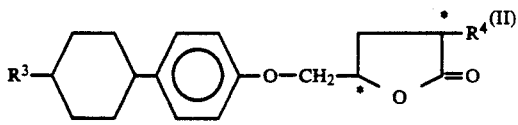

wherein $R^3$ and $R^4$ are, the same or different, a straight-chain or branched-chain alkyl group having 1 to 15 carbon atoms, and each asterisk represents an asymmetric carbon atom;

b) a ferroelectric liquid crystal composition of a) which further contains at least one chiral or non-chiral liquid crystal or non-liquid crystal compound;

c) a ferroelectric liquid crystal composition comprising at least one compound represented by the formula (I), at least one compound represented by the formula (II) and at least one compound represented by the formula (III)

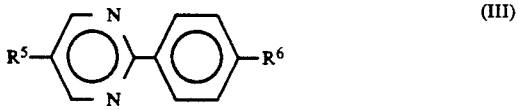

wherein $R^5$ and $R^6$ are a straight-chain or branched-chain alkyl or alkoxyl group having 1 to 15 carbon atoms;

d) a ferroelectric liquid crystal composition comprising at least one compound represented by the formula (I), at least one compound represented by the formula (II), at least one compound represented by the formula (III) and at least one compound represented by the formula (IV)

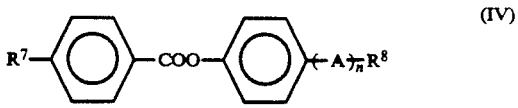

wherein $R^7$ and $R^8$ are a straight-chain or branched-chain alkyl or alkoxyl group having 1 to 15 carbon atoms, and A is a 1,4-phenylene group or 1,4-cyclohexylene group or a single bond; and liquid crystal device incorporating one of these ferroelectric liquid crystal compositions a)–d).

The compound of the formula (I) permits the ferroelectric liquid crystal composition to exhibit enhanced spontaneous polarization and high-speed responsiveness.

The combination of the compounds of the formulae (I) and (II) acts synergistically ensuring enhanced spontaneous polarization while preventing the crystallization of the ferroelectric liquid crystal composition comprising these compounds.

Further the compound of the formula (III) enables the composition incorporating this compound to exhibit a chiral smectic C phase over a wider temperature range and gives the composition a greater tilt angle.

The compound of the formula (IV) raises the upper limit temperature at which the composition exhibits the chiral smectic C phase, permitting the composition to exhibit balanced performance.

The ferroelectric liquid crystal compositions of the present invention exhibit the smectic C phase over a wide temperature range around room temperature and have a great tilt angle and high-speed responsiveness. The use of the ferroelectric liquid crystal composition affords a large-capacity ferroelectric liquid crystal device which is satisfactory in orientation, highly contrasty, bright and wide in operating temperature range.

DESCRIPTION OF THE PREFERRED EMBODIMENT

Figure 1:
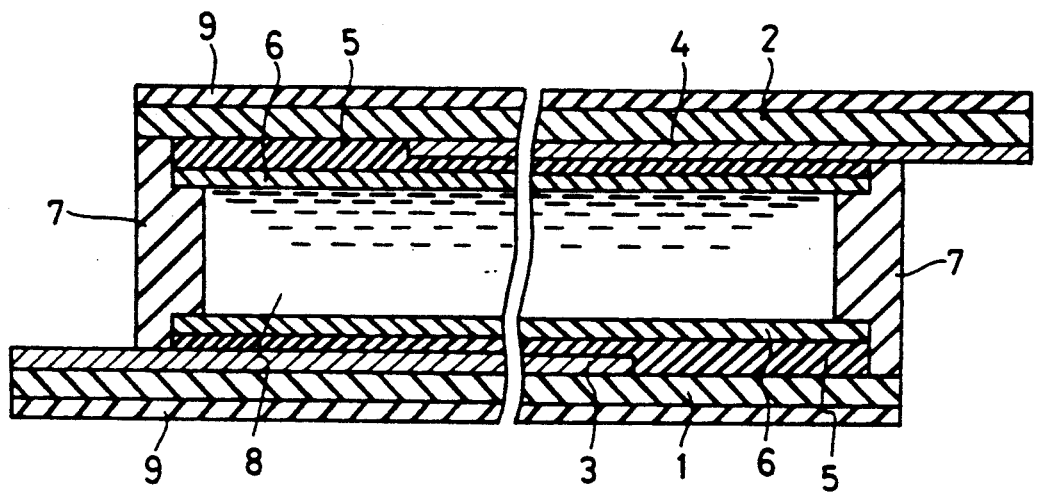
FIG. 1 is a diagram for illustrating a ferroelectric liquid crystal device comprising the composition of the present invention.

The compounds of the formulae (I) and (II) are those which have not been disclosed in literature.

Examples of straight-chain or branched-chain alkyl groups having 1 to 15 carbon atoms in the definitions of the formulae (I) and (II) include methyl, ethyl, propyl, isopropyl, butyl, isobutyl, pentyl, 1- or 2-methylbutyl, hexyl, 1- or 3-methylpentyl, heptyl, 1- or 4-methylhexyl, octyl, 1-methylheptyl, nonyl, 1- or 6-methyloctyl, decyl, 1-methylnonyl, undecyl, 1-methyldecyl, dodecyl, 1-methylundecyl and the like. These alkyl groups may have an asymmetric carbon atom in the carbon chain.

The compounds of the formulae (I) and (II) are in cis-form or trans-form. Compounds of either form are usable in the present invention. Such a compound can be prepared, for example, by reacting optically active epichlorohydrin with a phenol in the presence of a base to obtain a compound of the formula (V)

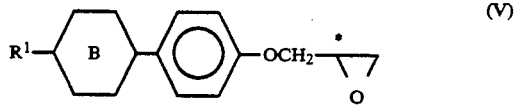

and reacting the resulting compound with a malonic acid ester of the formula (VI)

$$R^2—CH(COOR^9)_2 \qquad (VI)$$

in the present of a base. In the above formulae (V) and (VI), $R^1$ and $R^2$ each have the same meaning as in the definition of the formula (I),

is a 1,4-phenylene group or 1,4-cyclohexylene group, $R^9$ is methyl, ethyl or like lower alkyl group, and the asterisk represents an asymmetric carbon atom.

The R and S designations for the compounds of the formulae (I) and (II) were made according to the position number of the following chemical formulae.

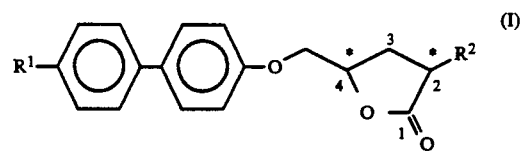

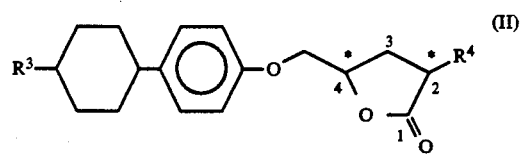

The compound of the formulae (I) and (II) do not always exhibit a liquid crystal phase, whereas when such compounds are added in a suitable amount to non-chiral or chiral smectic liquid crystal compounds or composition, the composition can be made to exhibit enhanced spontaneous polarization and high-speed responsiveness as a ferroelectric liquid crystal composition.

The compound of the formula (I) or (II) is added to the ferroelectric liquid crystal composition preferably in an amount of 0.1 to 10 wt. %, more preferably 0.5 to 3 wt. %. If the amount exceeds 10 wt. %, the ferroelectric liquid crystal composition is liable to crystallize. From the viewpoint of crystallization, it is desirable to use both compounds of the formulae (I) and (II) instead of using the compound of the formula (I) or (II) singly, whereby the composition can be given high-speed responsiveness without permitting crystallization. Especially, the compound of the formula (I) has a high melting point, is therefore prone to crystallize and could give rise to a problem when used singly. On the other hand, if it is used in a small amount, sufficient responsiveness is not available, so that it is necessary to increase the amount to some extent. Nevertheless, since the use of an increased amount of the compound leads to the problem of crystallization as already stated, it is desirable to use compounds of the formulae (I) and (II), which are different in structure, in combination. This realizes high-speed responsiveness without causing crystallization.

For preparing the liquid crystal composition of the present invention, chiral or non-chiral liquid crystal compounds and non-liquid crystal compounds can further be used conjointly with the combination of compounds of the formula (I) and (I). Among these compounds, especially preferable are the compounds of the following formulae (VII), (VIII) and (IX).

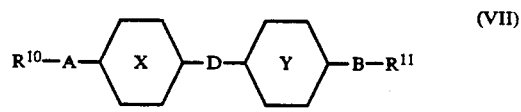

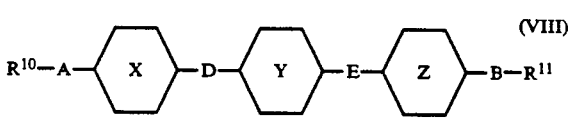

-continued

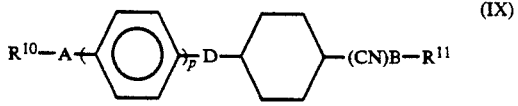

wherein A and B are each a single bond or —COO—, —OCO—, —CH=CH—COO—, —OCO—CH=CH—, —O—, —S—, —OCOO— or —CO— group, D and E are each a single bond or —COO—, —OCO—, —CH=N—, —N=CH—, —CH=CH—, —CaC—, —CH=CH—COO—, —OCO—CH=—CH—, —CH$_2$CH$_2$—, —OCH$_2$—, —CH$_2$O—, —COS— or —SCO— group,

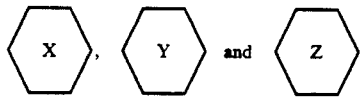

are the same or different and are each a six-membered ring such as a benzene ring, cyclohexane ring, bicyclo[2,2,2]octane ring, pyridine ring, pyrimidine ring, pyrazine ring, pyridazine ring, piperazine ring, pyran ring, dioxacyclohexane ring, thiapyran ring, dithian ring, thiadiazine ring or tetrazine ring, the hydrogen atom of the six-membered ring being substituted or unsubstituted with a fluorine atom, chlorine atom, bromine atom, cyano group, nitro group, lower alkyl group, lower alkoxy group or heavy hydrogen, $R^{10}$ and $R^{11}$ are the same or different and are each straight-chain or branched-chain alkyl having 1 to 15 carbon atoms and containing or not containing an asymmetric carbon atom, and p is an integer of 1 or 2.

Among these compounds, pyrimidine compounds represented by the formula (III)

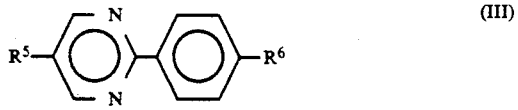

wherein $R^5$ and $R^6$ are each alkyl or alkoxyl having 1 to 15 carbon atoms, and ester compounds represented by the formula (IV)

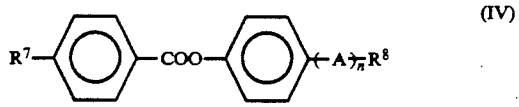

wherein $R^7$ and $R^8$ are each alkyl or alkoxyl having 1 to 15 carbon atoms, A is a 1,4-phenylene group or 1,4-cyclohexylene group or a single bond, and n is 0 or 1 readily exhibit a stable smectic C phase. When such compounds are admixed with the combination of compounds (I) and (II), a ferroelectric liquid crystal composition can be prepared which has satisfactory characteristics.

Next, liquid crystal display devices of the invention will be described with reference to the drawings.

FIG. 1 is a diagram for illustrating an example of liquid crystal device of the transmitting type having incorporated therein the ferroelectric liquid crystal composition of the invention. The device comprises insulating substrates 1,2, electrically conductive films 3,4, insulating film 5, orientation control layers 6, a sealant 7, the ferroelectric liquid crystal composition 8, and a polarizing plate 9.

The insulating substrates 1,2 used are light-transmitting substrates, which are usually glass substrates. Transparent ceramic substrates are also usable.

The substrates 1, 2 are respectively formed with transparent electrodes 3, 4 of specified pattern, each in the form of a conductive thin film of $InO_3$, $SnO_2$, ITO (Indium-tin Oxide) or the like.

The insulating film 5 is usually formed over the electrode but can be dispensed with as the case may be. Usable as the insulating film 5 is, for example, an inorganic thin film of $SiO_2$, $SiN_x$, $Al_2O_3$ or the like, or an organic thin film of polyimide, acrylic resin, photoresist resin, high polymer liquid crystal or the like. The insulating film 5, when in the form of an inorganic thin film, can be formed by sputtering, CVD (Chemical Vapor Deposition), solution coating or like method. Further the insulating film 5, when in the form of an organic thin film, can be prepared by applying a solution of an organic substance or of a precursor thereof by spinner coating, dip coating, screen printing, roll coating or like method, and curing the coating under predetermined conditions (as by heating or irradiation with light), or by vacuum evaporation, sputtering CVD or LB (Langumur-Blodgett) method.

The orientation control layer 6 is formed over the insulating film 5, but if the insulating film 5 is omitted, the control layer 6 is formed directly over each of the conductive films 3, 4. The control layer can be in the form of an inorganic layer or an organic layer.

The orientation control layer, when of the inorganic type, can be formed by oblique vacuum evaporation of silicon oxide, rotary vacuum evaporation or like method. When the orientation control layer is of the organic type, nylon, polyvinyl alcohol, polyimide or the like is usable, and the surface of the layer is usually rubbed. An oriented high polymer liquid crystal or LB film is also usable. Orientation can be given further by a magnetic field, or by the spacer edge method. The layer can also be prepared from $SiO_2$, $SiN_x$ or the like by vacuum evaporation, sputtering or CVD, followed by rubbing of the surface.

Subsequently, the two insulating substrates are placed over each other, and the liquid crystal composition is injected into the space therebetween to obtain a ferroelectric liquid crystal device.

Figure 2:
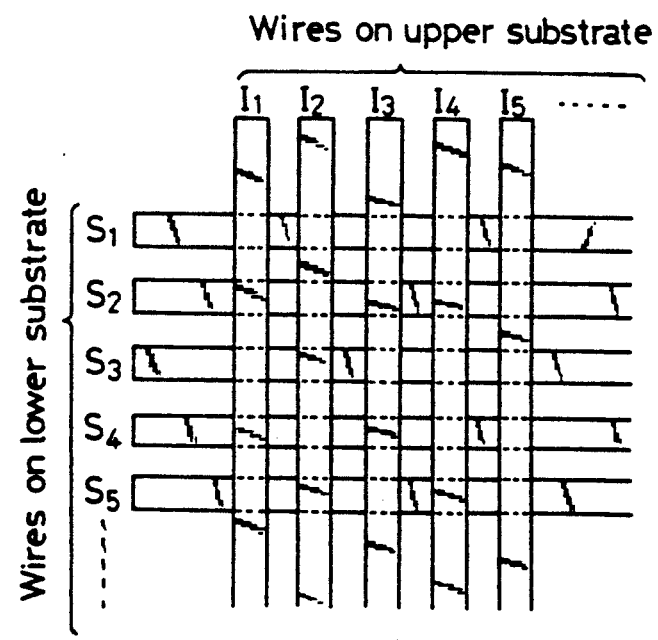
FIG. 2 is a diagram for illustrating the electrode wiring of a large-capacity ferroelectric liquid crystal display comprising a ferroelectric liquid crystal device of the invention.

Although the device described with reference to FIG. 1 is a switching device with one pixel, the ferroelectric liquid crystal composition of the invention can be used for display devices with a large-capacity matrix. In this case, the wires on the upper and lower substrates are combined into a matrix as shown in FIG. 2. The liquid crystal device of the matrix type can be driven by various drive methods heretofore proposed [Wakita, Uemura, Ohnishi, Ohba, Furubayashi and Ohta, National Technical Report, 33, 44(1987)].

EXAMPLE 1 a. Preparation of compound of the formula (I)

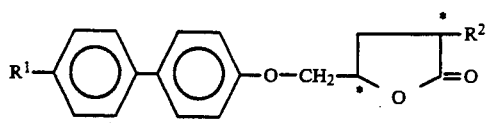

In 3 ml of dimethylformamide were dissolved 2.50 g of a phenol derivative represented by the formula

4.25 g of R-(—)-epichlorohydrin and 20 mg of benzyltriethyl ammonium chloride, and 1.2 equivalents of 24 wt. % aqueous solution of sodium hydroxide was added dropwise to the solution at 60° C. The mixture was reacted at the same temperature for 40 minutes, the reaction mixture was then cooled to room temperature and subjected to extraction with ether, and the extract was distilled in a vacuum to remove the solvent. The residue was purified by silica gel column chromatography, giving 1.62 g of glycidyl ether of S-configuration having the following characteristics values.

M.p. 90° C.
$[\alpha]_D^{25}+4.44°$ (C=1.01, $CH_2Cl_2$)
NMR ($CDCl_3$)
δ:0.50–3.00 (19H, m),
3.10–3.50 (1H, m),
3.80–4.30 (2H, m),
6.75–7.60 (8H, m), The product is represented by the formula

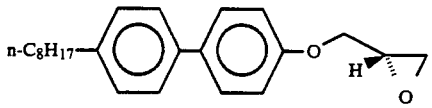

Subsequently, 370 mg of the glycidyl ether of S-configuration obtained, 442 mg of diethyl n-propylmalonate, 134 mg of potassium tert-butoxide and 3 ml of tert-butyl alcohol were mixed together and refluxed with stirring for 10 hours. The reaction mixture was cooled to room temperature, adjusted to a pH of 1 with 4N hydrochloric acid and washed with water and methanol, giving white crystals. The product was separated on purification by silica gel column chromatography into 240 mg of a γ-lactone derivative of (2R, 4S)-configuration. The former derivative had the following characteristics values. Phase transition temperature

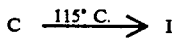

$[\alpha]_D^{28}+32.67°$ (C=1.081, CH
NMR ($CDCl_3$)
δ:0.70–3.00 (27H, m), 4.00–4.25 (2H, m), 4.40–4.85 (1H, m), 6.60–7.60 (8H, m),
IR (KBr) 1762 cm$^{-1}$
The derivative is represented by the formula

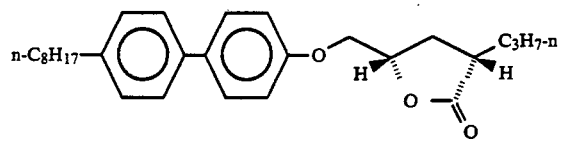

The latter derivative had the following characteristics values.

Phase transition temperature

C $\xrightarrow{117° C.}$ I $[\alpha]_D^{26}+22.59°$ (C=0.504, $CH_2Cl_2$)
NMR ($CDCl_3$)
δ:0.70–3.00 (27H, m), 4.00–4.25 (2H, m), 4.50–5.00 (1H, m), 6.60–7.60 (8H, m),
IR (KBr) 1762 cm$^{-1}$
The derivative is represented by the formula

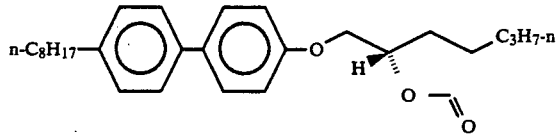

Furthermore, among the compound of the formula (I) preferable are prepared by the same method, and represented in the Table 1.

TABLE 1

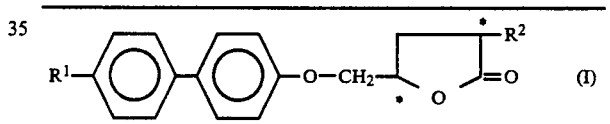

| $R_1$ | $R_2$ | Conformation | phase transition point C→$S_I$ | specific rotatory power $[\alpha]_D$ |
|---|---|---|---|---|
| n-$C_8H_{17}$ | n-$C_3H_7$ | (2R, 4S) | 117 | +22.50° (C = 0.504) |
| " | " | (2S, 4S) | 115 | +32.67° (C = 1.081) |
| n-$C_{12}H_{25}$ | n-$C_4H_9$ | (2R, 4R) | 130 | −28.56° (C = 1.06) |
| " | " | (2S, 4R) | 128 | −22.98° (C = 1.07) |
| n-$C_6H_{13}$ | $CH_3$ | (2R, 4S) | 129 | +27.58° (C = 1.076) |
| " | " | (2S, 4S) | 125 | +19.20° (C = 1.08) |
| " | n-$C_6H_{13}$ | (2R, 4S) | 136 | +27.36° (C = 0.876) |
| " | " | (2S, 4S) | 140 | +37.78° (C = 1.048) |
| " | n-$C_{10}H_{21}$— | (2R, 4S) | 132 | +25.56° (C = 1.037) |
| " | " | (2S, 4S) | 136 | +35.00° (C = 1.273) |
| n-$C_8H_{17}$ | $CH_3$ | (2R, 4S) | 129 | +25.24° (C = 1.048) |
| " | " | (2S, 4S) | 127 | +17.53° (C = 1.039) |
| " | n-$C_9H_{19}$ | (2R, 4S) | 132 | +22.26° (C = 0.826) |
| " | " | (2S, 4S) | 134 | +33.29° (C = 1.036) |
| " | n-$C_{12}H_{25}$ | (2R, 4S) | 130 | +24.52° (C = 1.870) |
| " | " | (2S, 4S) | 133 | +31.20° (C = 1.010) | b. Preparation of compound of the formula (II)

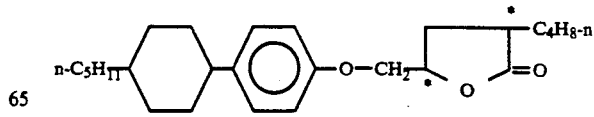

A mixture was prepared from 5.55 g of R-(—)-epichlorohydrin (at least 98.5% in chemical purity, at least 99% in optical purity), 2.46 g of 4-(trans-4-n-pentylcyclohexyl)phenol represented by the formula

and 0.04 g of benzyltriethyl ammonium chloride. While stirring the mixture at 60° C., an aqueous solution of sodium hydroxide (0.45 g of NaOH, 15 ml of water) was added dropwise thereto over a period of 20 minutes, followed by refluxing for 1 hour. The reaction mixture was cooled to room temperature and subjected to extraction with ether twice, the extract was washed with saturated aqueous solution of common salt once, and the solvent was distilled off in a vacuum. The residue was purified by silica gel column chromatography, giving 1.8 g of (S)-2,3-epoxypropyl-4-(trans-4-n-pentylcyclohexyl)phenyl ether represented by the following formula

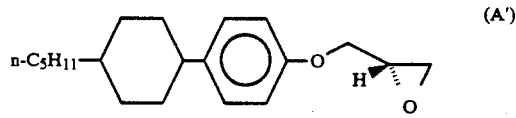

The compound (A') had the following physical properties.

$[\alpha]_D^{25} + 4.44°$ (C=1.36, CH$_2$Cl$_2$)
NMR (CDCl$_3$)
$\delta$:0.45–2.50 (2H, m), 2.50–3.00 (2H, m), 3.15–3.50 (1H, m), 3.70–4.30 (2H, m), 6.79(2H, d, J=9Hz), 7.09 (2H, d, J=9.0Hz)

Next, 224 mg of 50 wt. % suspension of sodium hydride in a mineral oil was washed with dry ether twice, and 10 ml of dry tetrahydrofuran was then added to the suspension. While stirring the resulting suspension at 40° C., 130 mg of dimethyl n-butylmalonate was added dropwise to the suspension, followed by stirring for 5 minutes. A 1.41 g quantity of the (S)-2,3-epoxypropyl-4-(trans-4-n-pentylcyclohexyl)phenyl ether (A') obtained above was added dropwise to the mixture, and the resulting mixture was refluxed with stirring for 20 hours. After cooling the reaction mixture to room temperature, 4N hydrochloric acid was added dropwise to the mixture to adjust the mixture to a pH of 1. The mixture was thereafter subjected to extraction with ether twice, the extract was washed with saturated aqueous solution of common salt once, and the solvent was distilled off in a vacuum. The residue was purified by silica gel column chromatography, giving 50 mg of a γ-lactone derivative of (2S, 4S)-configuration as as optically active compound.

The optically active compound of (2S, 4S)-configuration is represented by the following formula.

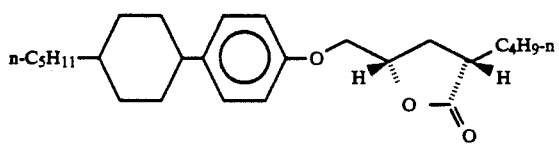

Given below are the physical properties of the compound and the result of elementary analysis thereof.

Phase transition temperature

$[\alpha]_D^{23} + 33.45°$ (C=0.658, CH$_2$Cl$_2$)
NMR (CDCl$_3$) $\delta$:0.88–1.98 (30H, m), 2.38–2.67 (3H, m), 4.07–4.13 (2H, m), 4.67–4.73 (1H, m), 6.83 (2H, d, J=8.3Hz), 7.12 (2H, d, J=8.3Hz)
IR (KBr) 1762 cm$^{-1}$

| Elementary analysis | C | H |
|---|---|---|
| Calcd. for C$_{26}$H$_{40}$O$_3$ (%): | 77.95 | 10.07 |
| Found (%): | 77.91 | 10.12 |

Furthermore, among the compound of the formula (II) preferable are prepared by the same method, and represented in the Table 2.

TABLE 2

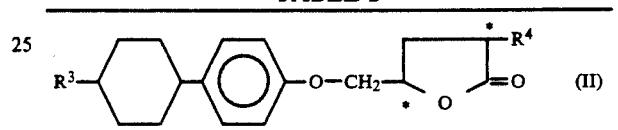

| R$^3$ | R$^4$ | Conformation | melting point | specific rotatory power $[\alpha]_D$, °C., (g/100 cm$^3$, CH$_2$Cl$_2$) |
|---|---|---|---|---|
| n-C$_3$H$_7$— | n-C$_9$H$_{19}$— | (2R, 4R) | 117 | −31.45, 30, 1.432 |
| n-C$_3$H$_7$— | n-C$_9$H$_{19}$— | (2S, 4R) | 139 | −23.48, 32, 1.027 |
| n-C$_5$H$_{11}$— | CH$_3$— | (2S, 4S) | * | +14.03, 27, 0.493 |
| n-C$_5$H$_{11}$— | C$_2$H$_5$— | (2S, 4S) | 98 | +29.57, 24, 0.165 |
| n-C$_5$H$_{11}$— | n-C$_4$H$_9$— | (2S, 4S) | 84 | +33.45, 23, 0.658 |
| " | " | (2R, 4S) | 85 | +20.37, 24, 1.050 |
| " | n-C$_7$H$_{15}$— | (2S, 4S) | 110 | +27.61, 25, 0.039 |
| n-C$_5$H$_{11}$— | n-C$_{11}$H$_{23}$— | (2S, 4S) | 105 | +21.64, 29, 1.085 |
| n-C$_5$H$_{11}$— | n-C$_{11}$H$_{23}$— | (2R, 4S) | 122 | +19.65, 29, 1.053 |
| n-C$_9$H$_{19}$— | n-C$_5$H$_{11}$— | (2S, 4S) | 98 | +27.52, 31, 1.194 |
| n-C$_9$H$_{19}$ | n-C$_5$H$_{11}$— | (2R, 4S) | 117 | +19.57, 32, 1.178 |
| n-C$_5$H$_{11}$— | 4-methyl-pentyl | (2S, 4S) | 93 | +35.24, 26, 0.894 |
| n-C$_5$-H$_{11}$— | 4-methyl-pentyl | (2R, 4S) | 113 | +22.66, 26, 0.991 |

*Crystal — Smectic A — Liquid

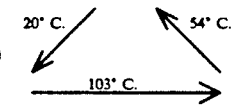

c. Preparation of ferroelectric liquid crystal composition

A liquid crystal composition was prepared from the compound of the following formulae prepared by the above methods of the present example, as compounds represented by the formulae (I) and (II)

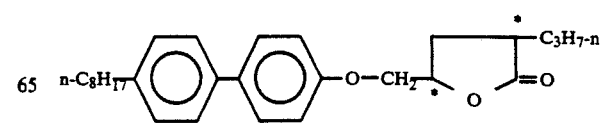

(2S, 4S) 2%

-continued

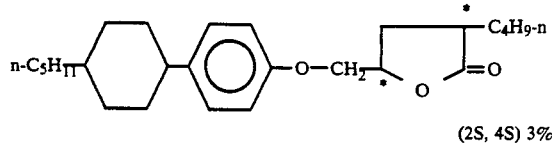

(2S, 4S) 3% and from the compounds of the following formula prepared by known methods, as compound represented by the formula (III)

C₇H₁₅—[pyrimidine]—[phenyl]—OC₇H₁₅    10%

C₇H₁₅—[pyrimidine]—[phenyl]—OC₈H₁₇    5%

C₇H₁₅—[pyrimidine]—[phenyl]—OC₉H₁₉    14%

C₈H₁₇—[pyrimidine]—[phenyl]—OC₈H₁₇    11%

C₉H₁₉—[pyrimidine]—[phenyl]—OC₆H₁₃    12%

C₉H₁₉—[pyrimidine]—[phenyl]—OC₉H₁₉    43%

This liquid crystal composition exhibited the phase transition of:

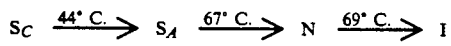

wherein $S_C$, $S_A$, N and i represent a smectic C phase, smectic A phase, nematic phase and isotropic liquid, respectively, the composition thus exhibiting the smectic C phase at room temperature.

d. Preparation and evaluation of liquid crystal device

Two liquid crystal cell members were prepared by forming an ITO film on each of two glass substrates, forming an $SiO_2$ film over the ITO film, coating the $SiO_2$ film with a nylon film and rubbing the resulting surface to form a liquid crystal orientation control layer. The two cell members were then affixed together to form a cell with a thickness of 2 μm, the above liquid crystal composition was injected into the cell, and the cell was then heated to 75° C. to temporarily change the composition to an isotropic liquid and thereafter cooled to room temperature at a rate of 1°/min, whereby the liquid crystal composition was satisfactorily oriented.

The liquid crystal cell was interposed between two polarizers arranged at right angles with each other, and rectangular waves of $V_{p-p}=20$ V were applied, whereupon a change was observed in the intensity of transmitted light. The response speed determined from this change in the intensity of transmitted light was 58 μsec at 25° C., and the tilt angle was 16°.

COMPARATIVE EXAMPLE 1

The liquid crystal composition given below was prepared from compounds of the formula (I) and formula without using the compound of the formula (II).

n-C₈H₁₇—[phenyl]—[phenyl]—O—CH₂—[lactone with C₃H₇-n]    (2S, 4S) 5%

C₇H₁₅—[pyrimidine]—[phenyl]—OC₇H₁₅    10%

C₇H₁₅—[pyrimidine]—[phenyl]—OC₈H₁₇    5%

C₇H₁₅—[pyrimidine]—[phenyl]—OC₉H₁₉    14%

C₈H₁₇—[pyrimidine]—[phenyl]—OC₈H₁₇    11%

C₉H₁₉—[pyrimidine]—[phenyl]—OC₆H₁₃    12%

C₉H₁₉—[pyrimidine]—[phenyl]—OC₆H₁₉    44%

This liquid crystal composition exhibited a smectic C phase at room temperature and underwent the phase transition of:

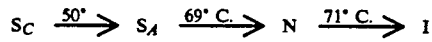

However, when allowed to stand at room temperature for a long period of time, the composition crystallized.

A ferroelectric liquid crystal cell was prepared in the same manner as in Example 1, and rectangular waves of $V_{p-p}=20$ V were applied. The response speed determined from the resulting change in the intensity of transmitted light was 75 μsec at 25° C., and the tilt angle was 18°.

COMPARATIVE EXAMPLE 2

The liquid crystal composition given below was prepared from compounds of the formulae (II) and (III) without using any compound of the formula (I).

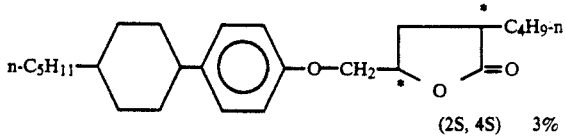 (2S, 4S) 3%

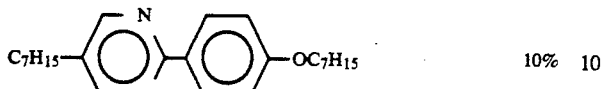 10%

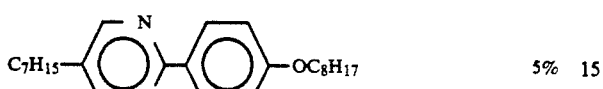 5%

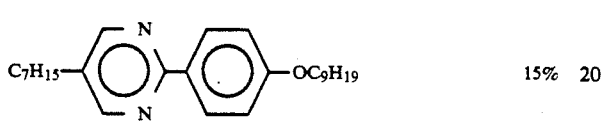 15%

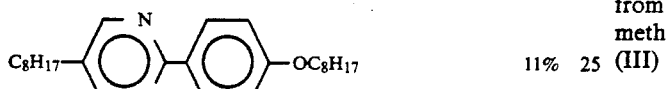 11%

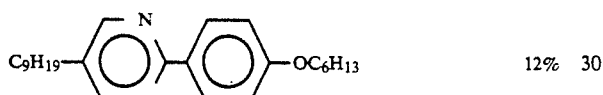 12%

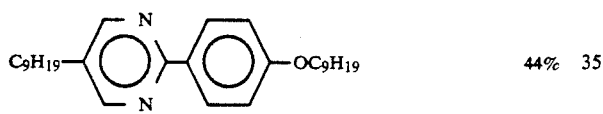 44%

This liquid crystal composition exhibited a smectic C phase at room temperature and underwent the phase translation of:

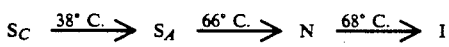

A ferroelectric liquid crystal cell was prepared in the same manner as in Example 1, and rectangular waves of $V_{p-p} = 20$ V were applied to the cell. The response speed determined from the resulting change in the intensity of transmitted light was 56 μsec at 25° C., and the tilt angle was 11°.

The ferroelectric liquid crystal composition of Example 1 was superior to those of Comparative Examples 1 and 2 as described below.

The composition of Comparative Example 1 crystallized when allowed to stand at room temperature for a long period of time and was not serviceable for actual use. On the other hand, the composition of Example 1 remained free of crystallization and was higher in response speed than the composition of Comparative Example 1.

The composition of Comparative Example 2 was low in the upper limit temperature of the chiral smectic C phase and therefore is not desirable for use. With the composition of Example 1, the upper limit temperature of the chiral smectic C phase was higher than in the case of the composition of Comparative Example 2 without greatly reducing the response speed, owing to the presence of the compound (I). The composition of Example 1 was also greater in tilt angle.

EXAMPLE 2

A liquid crystal composition was prepared from the following compounds prepared by the methods of Example 1 as compounds represented by the formulae (I) and (II)

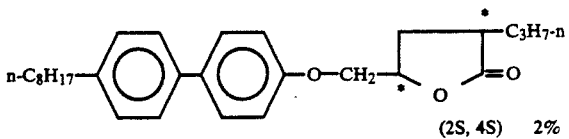 (2S, 4S) 2%

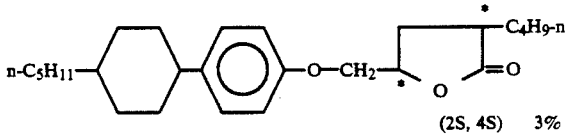 (2S, 4S) 3% from the following compounds prepared by known methods, as compounds represented by the formula (III)

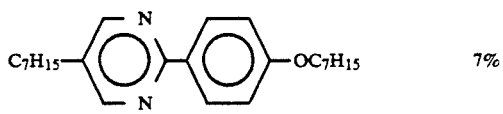 7%

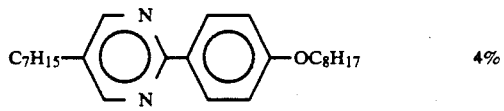 4%

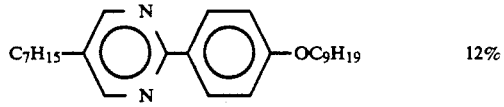 12%

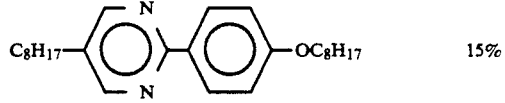 15%

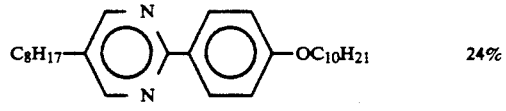 24%

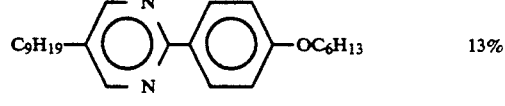 13% and from the following compounds prepared by known methods, as compounds represented by the formula (IV)

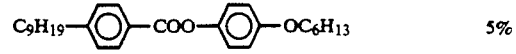 5%

 5%

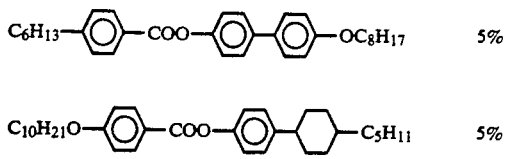  5%

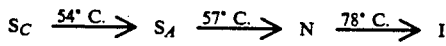  5%

This liquid crystal composition exhibited a smectic C phase at room temperature and underwent the phase transition of:

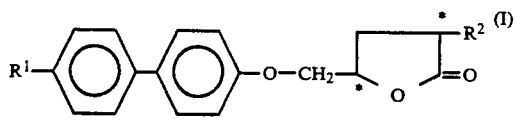

A liquid crystal cell was prepared in the same manner as in Example 1, and rectangular waves of $V_{p-p}=20$ V were applied to the cell. The response speed determined from the resulting change in the intensity of transmitted light was 107 μsec at 25° C., and the tilt angle was 30°. The presence of the combination of compounds of the formulae (I) and (II) in this composition realized high-speed responsiveness without permitting crystallization at low temperatures. Further the combination of ester compounds with these compounds made it possible to raise the upper limit temperature of the chiral smectic C phase.

What we claimed is:

1. A ferroelectric liquid crystal composition comprising at least one compound represented by the formula (I):

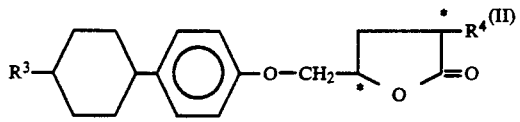

wherein $R^1$ and $R^2$ are, the same or different, a straight-chain or branched-chain alkyl group having 1 to 15 carbon atoms, and each asterisk represents an asymmetric carbon atom, and at least one compound represented by the formula (II):

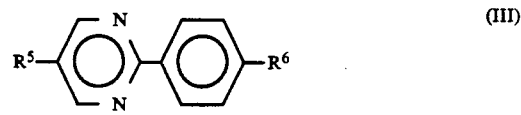

wherein $R^3$ and $R^4$ are, the same or different, a straight-chain or branched-chain alkyl group having 1 to 15 carbon atoms, and each asterisk represents an asymmetric carbon atom.

2. A ferroelectric liquid crystal composition of claim 1 which further contains at least one chiral or non-chiral liquid crystal or non-liquid crystal compound.

3. A ferroelectric liquid crystal composition of claim 2 in which the chiral or non-chiral liquid crystal or non-liquid crystal compound is a compound of the formula (III):

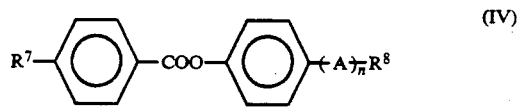

wherein $R^5$ and $R^6$ are a straight-chain or branched-chain alkyl or alkoxyl group having 1 to 15 carbon atoms.

4. A ferroelectric liquid crystal composition of claim 2 in which the chiral or non-chiral liquid crystal or non-liquid crystal compounds comprises at least one compound (III) as defined in claim 3 and at least one compound (IV):

$$R^7-\bigcirc-COO-\bigcirc-(A)_n-R^8 \quad (IV)$$

wherein N is one or zero, $R^7$ and $R^8$ are a straight-chain or branched-chain alkyl or alkoxyl group having 1 to 15 carbon atoms, and A is a 1,4-phenylene group or 1,4-cyclohexylene group or a single bond.

5. A ferroelectric liquid crystal composition of claim 2 in which each of the compounds (I) and (II) are contained in the amount of 0.1-10 wt%.

6. A liquid crystal device incorporating a ferroelectric liquid crystal composition as defined in any one of claims 1 to 5.

* * * * *